Jan. 11, 1944. J. W. MYERS 2,339,183
TOASTER
Filed Oct. 17, 1941 5 Sheets-Sheet 1

Inventor:
Joseph W. Myers
by his Attorneys
Howson & Howson

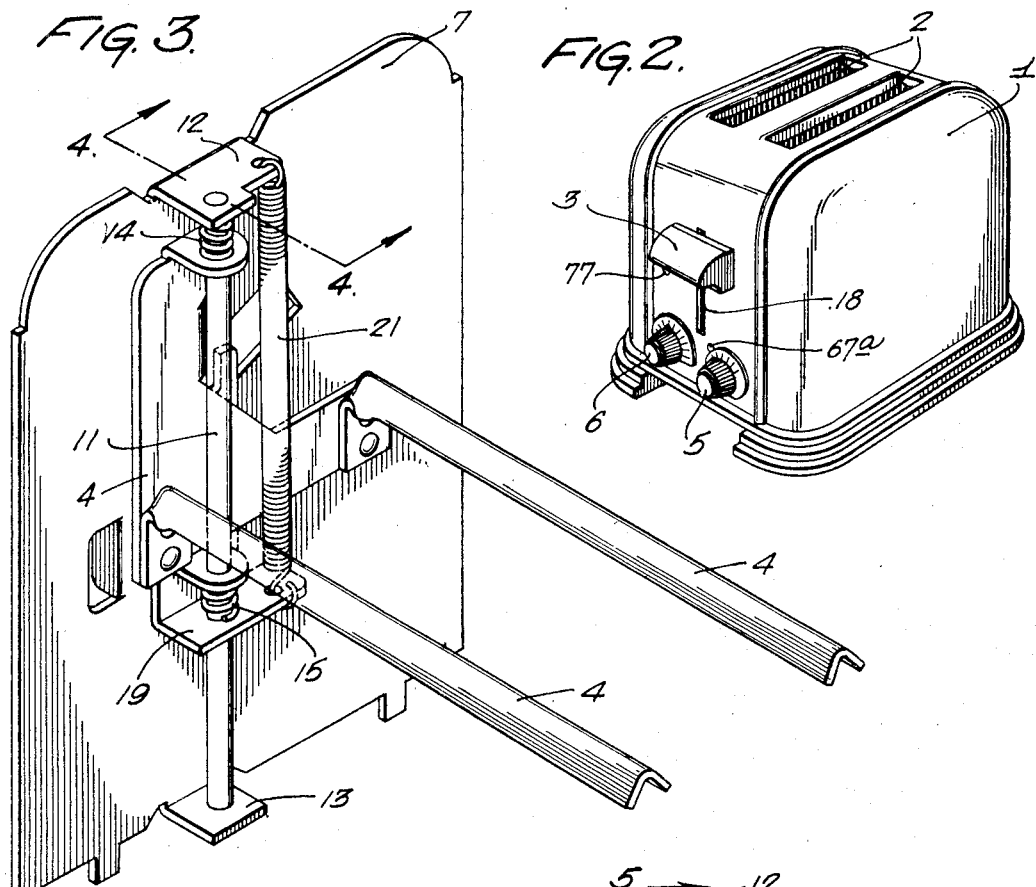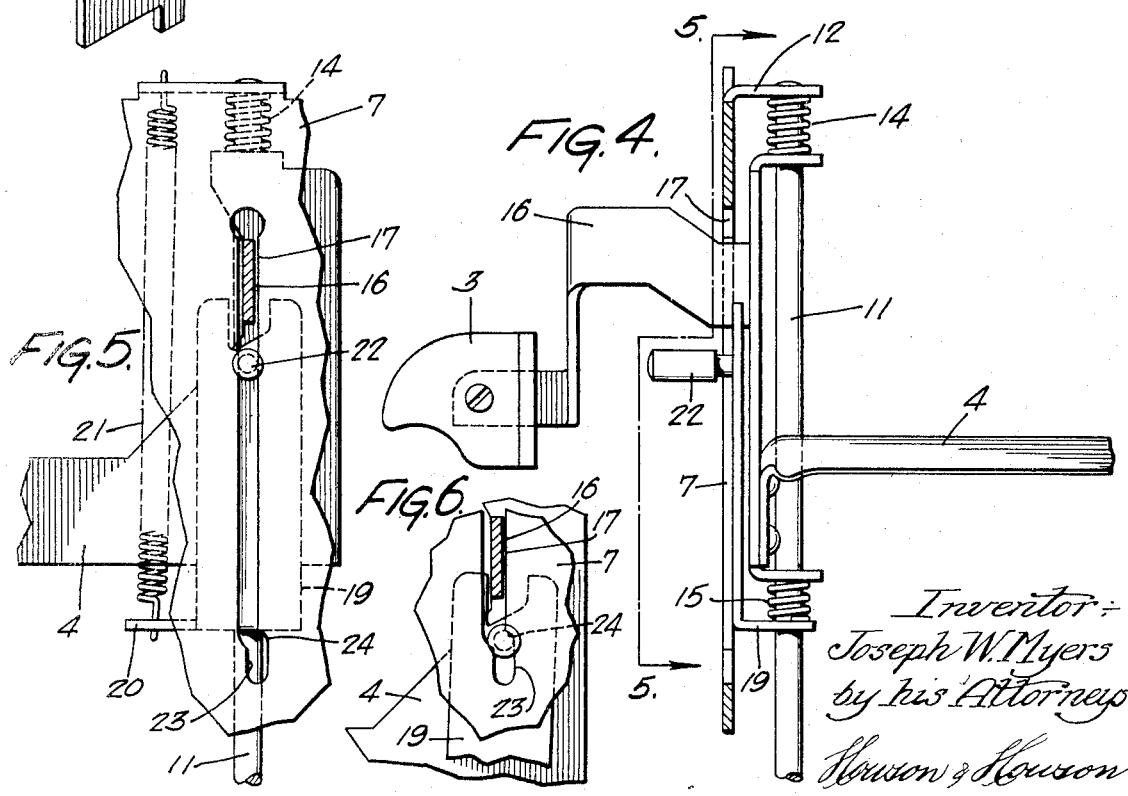

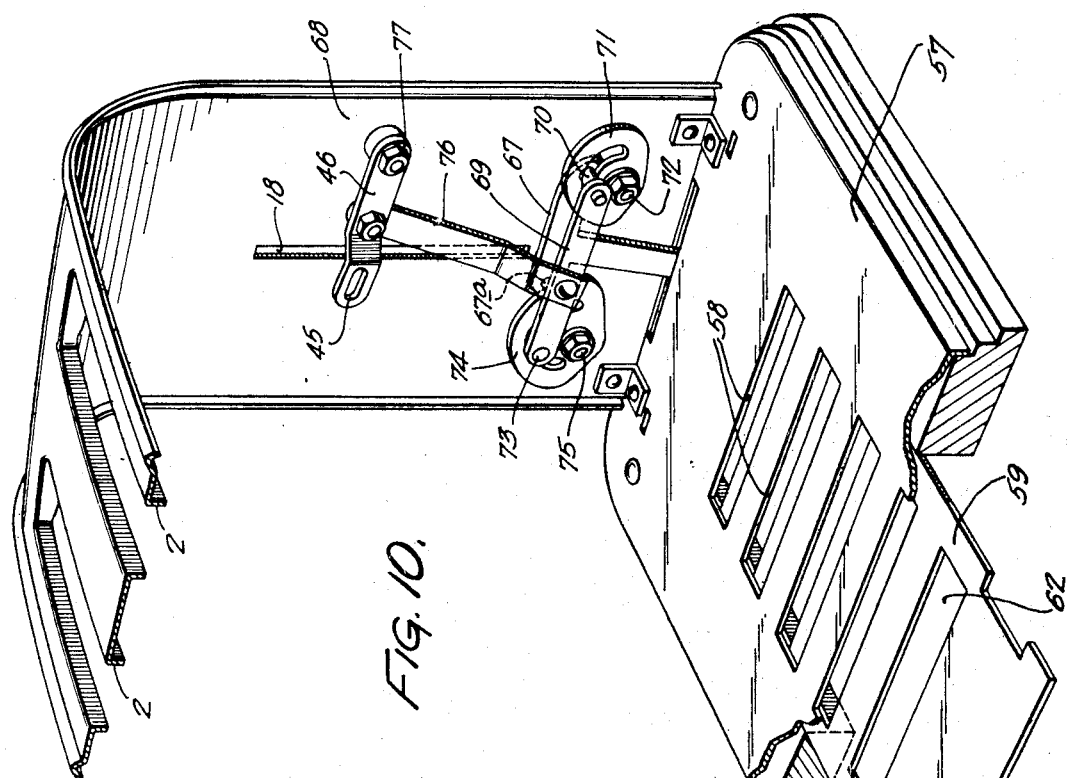
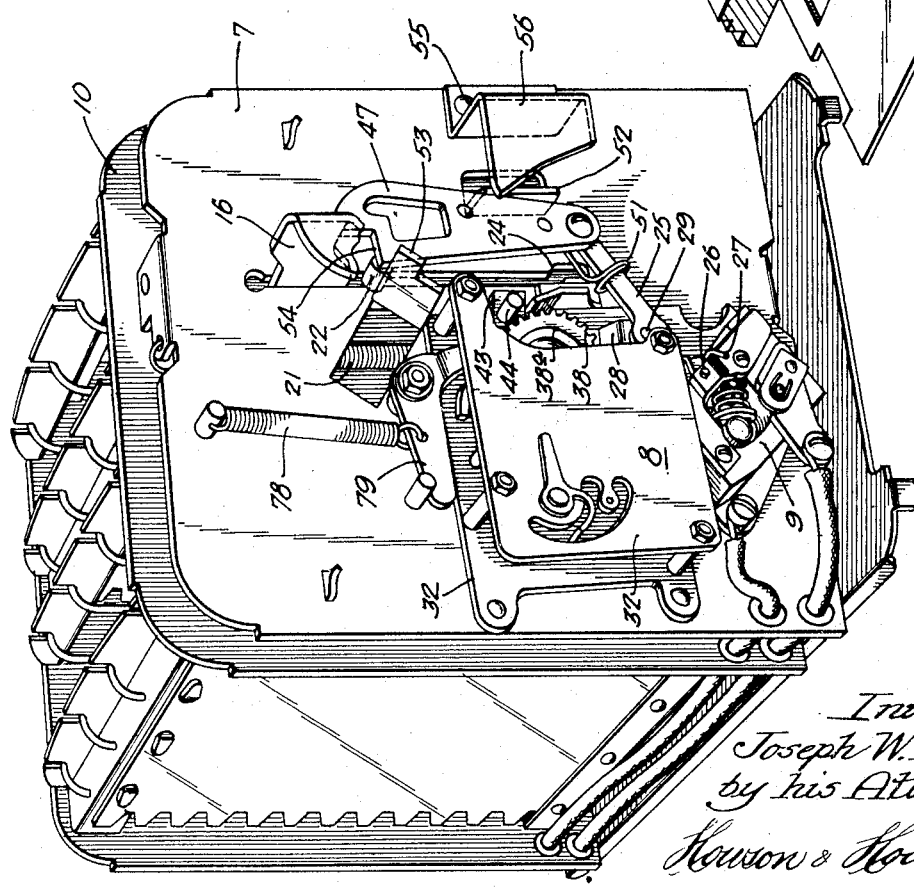

Jan. 11, 1944. J. W. MYERS 2,339,183
TOASTER
Filed Oct. 17, 1941 5 Sheets-Sheet 4
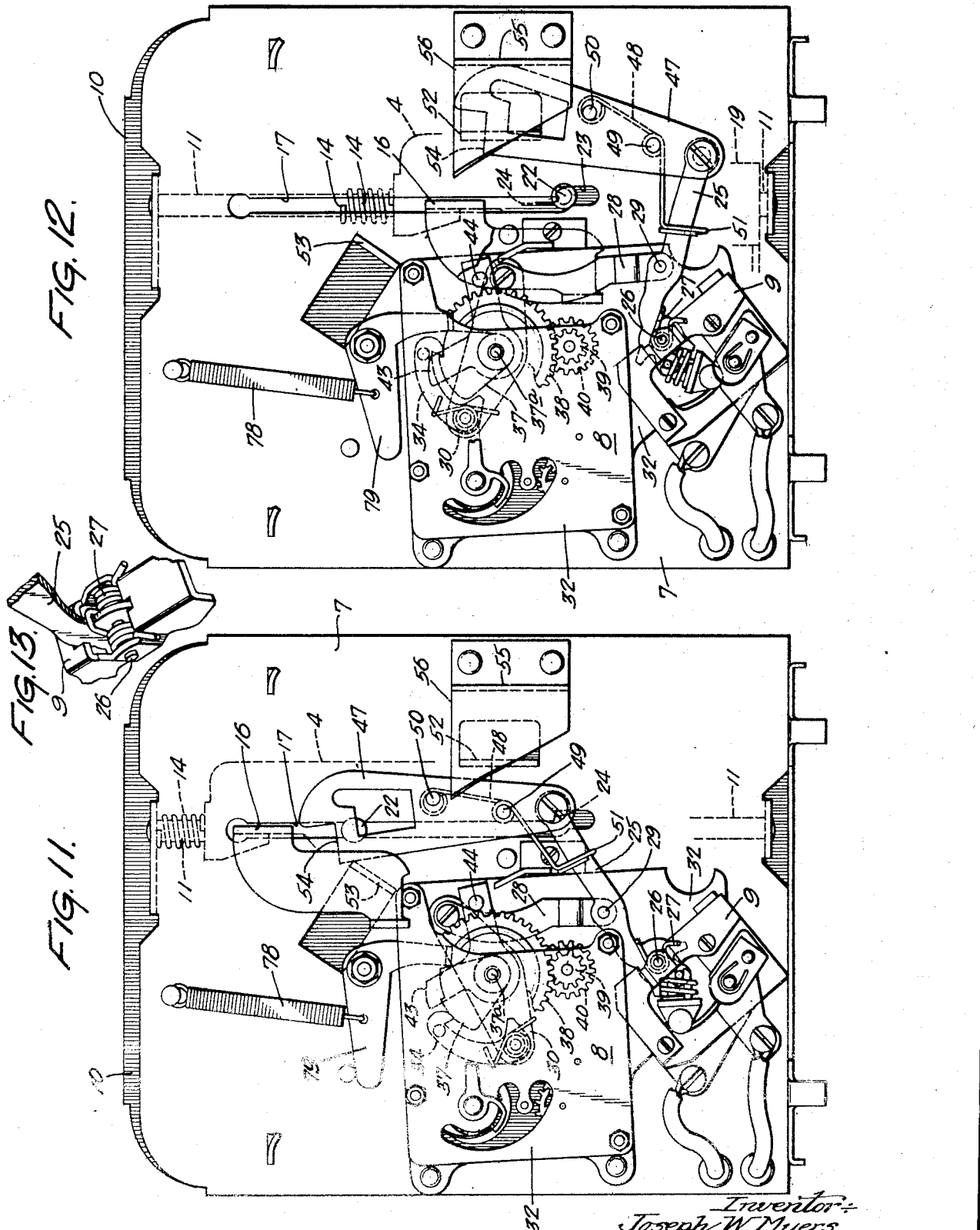
Inventor:
Joseph W. Myers
by his Attorneys
Howson & Howson

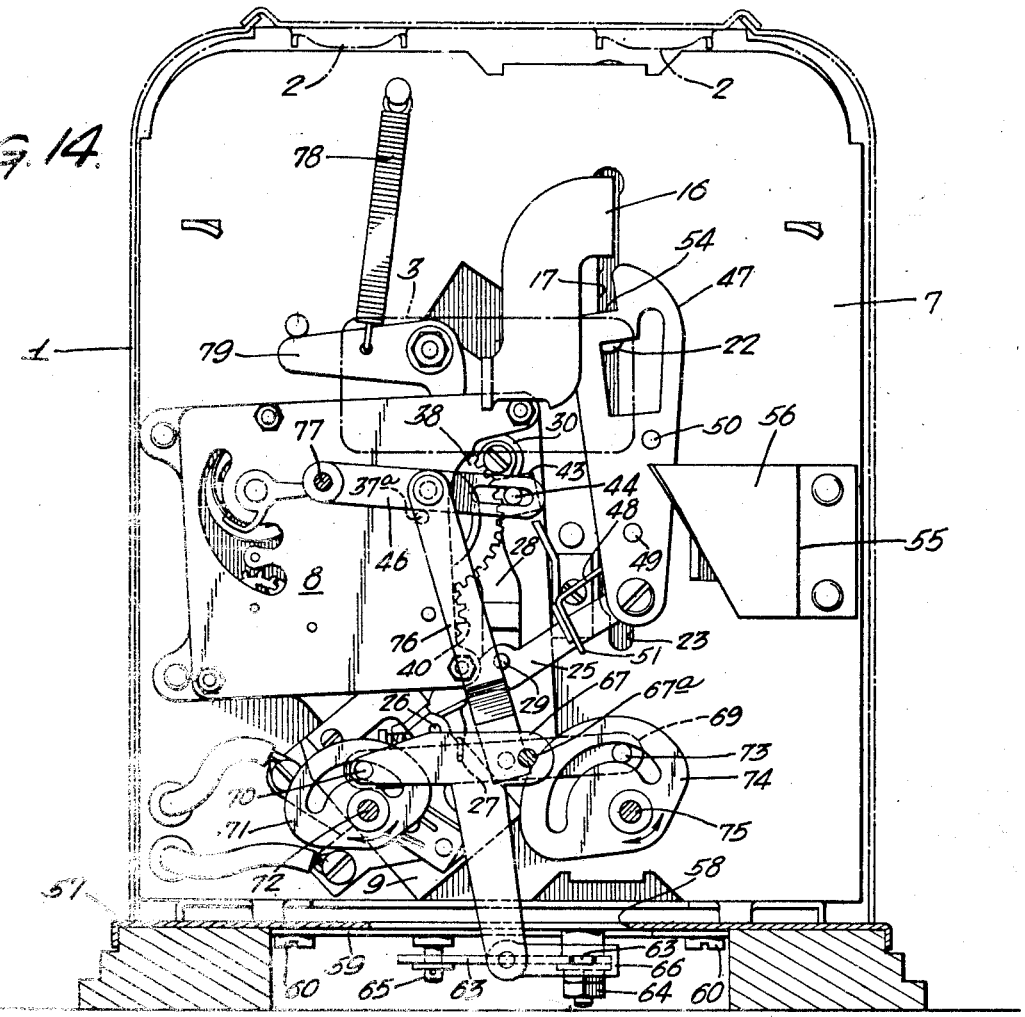

Patented Jan. 11, 1944

2,339,183

UNITED STATES PATENT OFFICE 2,339,183

TOASTER

Joseph W. Myers, Philadelphia, Pa., assignor to Proctor & Schwartz, Inc., Philadelphia, Pa., a corporation of Pennsylvania Application October 17, 1941, Serial No. 415,455

15 Claims. (Cl. 99—327)

This invention relates to automatic cooking devices and more particularly to automatic bread toasters for the toasting of bread slices to a desired color and to a desired degree of crispness.

In most toasters proposed heretofore, it has been the practice to toast bread slices by subjecting them to a continuous predetermined non-adjustable rate of toasting until the surfaces have reached the desired color. Such toasters have employed a single manually adjustable control by means of which the operator may effect the toasting of the bread to a desired color such as light, medium, or dark. This adjustable control functions to control the toasting interval, usually through the medium of a thermostatic switch or mechanical clock adjusted by the said control. In most modern toasters, the current is cut off and the toasted bread is discharged at the end of the toasting period.

In automatic toasters of this type, it has been impossible to control the crispness or texture of the toasted bread to obtain varying degrees of crispness for any particular color. Where crisp, dry toast has been desired, as by invalids, it has been necessary to make such toast in an oven wherein the bread is subjected to a moderate heat for a considerable time, rather than by the usual toasting method wherein the bread is subjected to a rather intense, searing heat for a short time. It should be noted that the crispness of a piece of toast depends upon the length of time it has been subjected to heat sufficient in temperature to drive out the water vapor.

It has been proposed heretofore, in my copending application Serial No. 379,706, filed February 19, 1941, to toast bread to a desired color by subjecting it to a toasting period of high toasting rate, and to dry the bread to a desired texture or crispness by subjecting it to a toasting period of a substantially lower toasting rate. The principal object of my present invention is to provide an automatic bread toaster in which the period of toasting and the rate of toasting are cooperatively variable so that the degree of crispness of toast of a selected color may be manually selectable by the operator.

It is further desirable in toasting bread to make the most economical use of energy to obtain the toasting of the bread, in order to afford minimum cost of operation to the customer and to cause minimum power drain from the power supply source. The toasting of bread is more rapid when the ventilation of a toaster is restricted so that less heat is lost by convection air currents leaving the toaster. For example, a toaster, the bottom of which is closed off to restrict the ventilation, will make a medium brown slice of toast in 1¼ minutes with 600 watt heating units. With a toaster in which the ventilation is not thus restricted, 1000 watts or more is required for the heating units in order to make toast of the same color in the same time. It is proposed, according to the present invention, to use a low wattage toaster in which the ventilation may be varied so as to vary the toasting rate and thus allow for variable degrees of crispness. It is obvious that other means might be used, for changing the toasting rate, in place of the variable ventilation. Thus, the toasting rate might be varied with the use of a constant ventilation, but a variable average wattage input to the toaster. This variable input might be obtained in a variety of well known ways, such as connecting resistances or impedances in series with the toasting units and thus reducing the voltage and hence the wattage of the toasting units, by connecting a thermal or mechanical variable-input device in series with the heating elements to reduce the average energy input rate, or by the use of a variable auto-transformer to reduce the voltage supplied to the heating elements. The variable ventilation means, however, is preferred because of its ease of manufacture, freedom from the production of radio interference, and because it permits the economy of the low wattage toaster.

Another object of my invention, therefore, is to provide an automatic electric toaster of low wattage in which the crispness of the toast as well as the color thereof is manually selectable by the operator.

A further object of the invention is to provide a variable toasting rate in an automatic electric toaster by varying the degree of ventilation of the toaster.

Other objects and features of the invention will be apparent hereinafter.

In the accompanying drawings:

Fig. 2 is a perspective view of a toaster embodying the invention;

Fig. 3 is a perspective view of a portion of the toaster, showing the bread carriage and mounting therefor;

Fig. 4 is a sectional view taken along line 4—4 of Fig. 3;

Fig. 5 is a sectional view taken along line 5—5 of Fig. 4;

Fig. 6 is a fragmentary view similar to Fig. 5 showing the parts in different position;

Fig. 9 is a perspective view of the interior structure removed from the outer cover or casing;

Fig. 10 is a fragmentary perspective view of the base and cover showing control mechanism and its mounting;

Fig. 11 is a front view of the interior structure showing the operating mechanism in non-operative condition;

Fig. 12 is a similar view showing the mechanism in operative condition;

Fig. 13 is a fragmentary detail perspective view showing the clock operating spring;

Fig. 14 is a front face view of the operating mechanism taken from just inside the front wall of the outer cover and showing the adjusting mechanism;

Fig. 15 is an enlarged detail view of the clock control mechanism; and

Fig. 16 is a sectional view taken along line 16—16 of Fig. 15.

Figure 1:
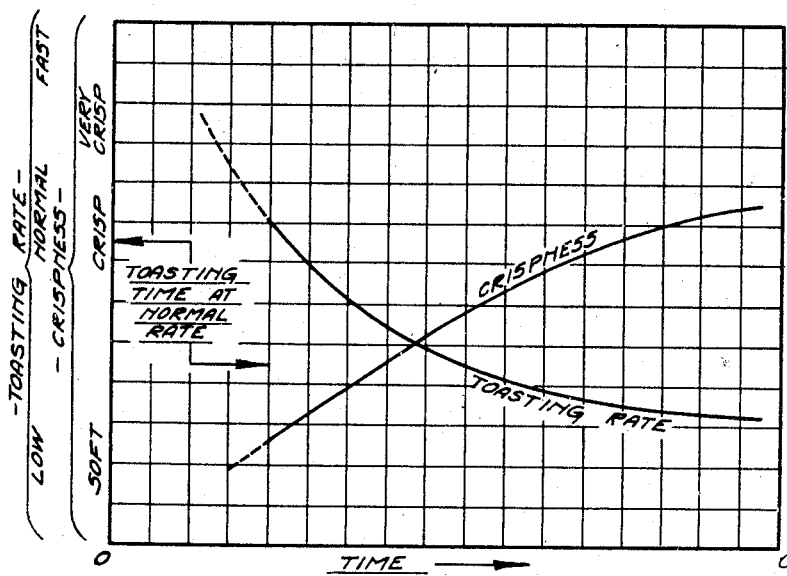
Fig. 1 is a graph showing the variation of toasting rate and crispness with the time of toasting for the production of toast of a desired color.

Fig. 1 demonstrates more fully the principle upon which the present invention operates. In this figure are shown graphically the relation between the toasting rate and the time necessary to produce toast of a given color, and the relation between the time of toasting and the crispness produced in toast of a given color. It will be understood that for all points on these curves the same initial thermal condition of the toaster is assumed before the toasting cycle begins. It can be readily seen that as the toasting rate decreases, the time required to toast the bread to the given color is considerably lengthened. Also, as this time is lengthened, the degree of crispness of the toast is considerably increased. It will be understood, of course, since the degree of crispness is a subjective quantity and difficult to measure, the curve of crispness is really only a qualitative indication of the variation. Further, it will be understood that a separate pair of curves will exist for any chosen color, similar to the ones shown, and the various details of the curves as well as the units along the coordinate axes will be determined by the color of toast under consideration as well as the structural details of the specific toaster in question, such as degree of ventilation, wattage of the heating elements, method of varying toasting time, precise initial condition chosen for obtaining the points on the curves, and so on.

Figure 8:
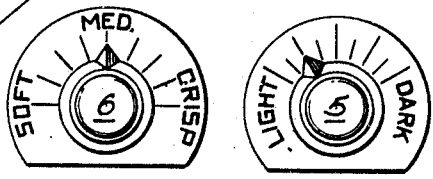
Fig. 8 is a detail face view of the color and crispness controls.

A specific embodiment of the invention is disclosed in the other figures. I provide an automatic electric toaster shown generally in Fig. 2, having the usual body 1, bread wells 2, and heating elements (not visible) which are preferably of low wattage as mentioned above. A knob 3 is provided, by means of which the bread carriage 4 (Figs. 3 and 4) may be manually moved into a toasting position. A knob 5 is provided by means of which the operator may vary the color of the toast manually, and a knob 6 is provided by means of which the operator may manually select the texture of the toast. These knobs and their associated indicia are shown in greater detail in Fig. 8.

A front plate 7 (see Fig. 9) is provided which carries a clock 8, a switch 9 which controls the heating elements, and clock operating and tripping mechanism. The plate 7 is slightly spaced from plate 10 which is part of the framework of the toaster proper. Bread carriage 4 is mounted slidably on post 11 (see Figs. 3 and 4) held by tabs 12 and 13 extending from plate 7. Spring 14 is provided, slidably movable along post 11 to absorb the shock of the motion of bread carriage 4 at the upper end of its travel. A spring 15 is provided, slidably movable along post 11, for a purpose to be described later. An arm 16 extends outward from bread carriage 4 through slot 17 in plate 7, and further through slot 18 in the outer cover. To the end of arm 16 is attached the knob 3. The bread carriage 4 is urged gravitationally to assume its depressed position if allowed to do so, but it is normally held in elevated position, as described hereinafter.

A carriage-actuating slide 19 is slidably mounted on post 11 below carriage 4. The slide 19 is loosely mounted on the post 11 so that a rocking motion with respect to post 11 is allowed. On slide 19 is a tab 20 to which is fastened the lower end of a tension spring 21, the upper end of which is attached to tab 12 on plate 7, so that the slide 19 is urged to its raised or elevated position. The spring 21 also urges the slide 19 to rock in a clockwise direction as viewed in Fig. 5. Fixed on the slide 19 is a pin 22 which extends through slot 17. Over the longer portion of its length slot 17 is aligned substantially with post 11, so that when pin 22 rides in this portion of slot 17, the slide 19 is prevented from rocking in a clockwise direction, and the slide will move freely in a vertical direction. Near its lower end, the slot 17 has an offset portion 23 (Fig. 5) which is out of alignment with post 11, so that slide 19 can rock clockwise when pin 22 enters the offset portion. The shoulder 24 thus receives the force of the spring 21 in a substantially normal direction, and prevents upward motion of slide 19, when the same is moved to its lower or depressed position. It will be seen that the relation of carriage 4 and slide 19 is such that when carriage 4 is moved to its depressed position, it forces slide 19 into its depressed position, wherein it latches as described above. When slide 19 is moved to its raised position, carriage 4 is also carried to its raised position.

A lever 25 (see Figs. 11 to 13) is pivoted at 26 on switch 9. One end of lever 25 is arranged to actuate switch 9 which is a conventional toggle switch. A strong helical spring 27 is centered on pivot 26 and is arranged to urge the lever 25 in a counterclockwise direction, as viewed in Figs. 11 and 12. A connecting link 28 is pivotally attached to lever 25 at 29. Link 28 is pivotally attached to lever 30 of clock 8 (see Figs. 15 and 16). The clock is supplied with energy from the spring 27 through lever 25 and link 28. Lever 30 is pivotally mounted on stud 31 affixed to the clock frame 32. A stud 33 rigidly attached to lever 30 carries a loosely mounted pawl 34 which is urged clockwise by spring 35. The hooked end of pawl 34 is adapted to engage a shoulder 36 on member 37 which is keyed to a rotatable shaft 37a. A gear 38 is loosely mounted on shaft 37a and is frictionally coupled to member 37 through resilient disc 38a. Gear 38 is connected through gears 39 and 40 to the escapement mechanism which is of conventional form.

The hooked end of pawl 34 carries a stud 41 on which is mounted a roller 42. A cam member 43, loosely mounted on stud 31, is engageable by roller 42 to release the pawl from shoulder 36, as described hereinafter. Member 43 carries a pin 44 which extends into a slot 45 in arm

46. The latter forms part of an adjusting mechanism to be described later and by which the cam member may be variously positioned to vary the time duration of the toasting cycle.

When the lever 25 is rotated clockwise from the position of Fig. 11, lever 30 is rotated clockwise, and pawl 34 engages shoulder 36. At the same time, the projection 34a on the pawl engages member 37 and positions it for commencement of the timing cycle. The energy stored in spring 27 is transferred through lever 25, link 28, and lever 30 to member 37 which rotates slowly counterclockwise, its motion being governed by the escapement mechanism to which it is frictionally coupled. During this movement roller 42 rides up the cam edge 43a of cam member 43 and gradually raises the hooked end of pawl 34 until it is disengaged from shoulder 36. When this takes place, the lever 25 snaps to its greatest counterclockwise position, shown in Fig. 11, and in doing so it strikes pin 22 and releases the pin from its latched position, thereby terminating the toasting operation.

From the above description, it will be seen that the time duration of the toasting cycle is dependent on the position of the cam member 43, the adjusting mechanism for which will be described presently.

For the purpose of this invention, the clock employed is capable of operating over a longer interval than those employed in previous toasters of this general type. For example, the clock may have a maximum running period of 6 or more minutes as opposed to a running period of 4 or less minutes for clocks in prior toasters of this general type.

Referring again to Figs. 11 and 12, there is loosely pivoted on lever 25 an actuating member 47. A spring 48 is wound helically about a pin 49 on member 47. One end of spring 48 is looped about a pin 50 on member 47, while the other end of spring 48 is looped at 51 about lever 25. This arrangement urges the member 47 in a counterclockwise direction when the lever 25 is in its full counterclockwise position, as in Fig. 11, but allows member 47 to rotate in a clockwise direction under the force of gravity when lever 25 is in its full clockwise position, as in Fig. 12. The pin 50 cooperates with a tab 52 bent out from plate 7. When the member 47 is at either end of its travel, as in Figs. 11 and 12, the pin 50 does not engage tab 52, but at intermediate position engagement between these parts occurs. When the member 47 is in its upper position, it is urged in a counterclockwise direction, and as pin 50 is not in engagement with tab 52, the member moves to engage a tab 53 also bent out from plate 7. When arm 16 is depressed manually, it engages shoulder 54 of member 47 (see Fig. 11) and depresses it to its lower position. During this travel, the pin 50 prevents the member 47 from rotating clockwise by virtue of its being to the left of tab 52. When the arm 16 is released, it rises slightly (due to spring 15), and disengages itself from shoulder 54 of member 47. Member 47 thereupon rotates clockwise under the force of gravity until it engages wall 55 of a retention stop 56 attached to plate 7 (see Figs. 9 and 12). As the lever 25 rotates counterclockwise, the member 47 moves upward. During this travel, pin 50 is to the right of tab 52 and prevents rotation of the member 47 in a counterclockwise direction. At the upper end of travel, the pin 50 rises above tab 52 and the member 47 rotates counterclockwise by virtue of spring 48, as explained heretofore. Retention member 56 serves to prevent the actuating member 47 from getting out of the plane of operation of the parts due to its relatively free connection to lever 25.

The operation of the mechanism so far described is as follows:

The parts are initially as shown in Fig. 11, the bread carriage being raised and the switch 9 being open. The operator, in initiating the toasting cycle, places bread upon the bread support 4 and then depresses knob 3. This depresses slide 19, which is latched in position by the cooperation of pin 22 with offset portion of slot 17. Simultaneously, member 47 is depressed, rotating lever 25 in a clockwise direction, thereby storing energy in spring 27 and actuating switch 9, energizing the heating elements of the toaster. When the operator releases knob 3, arm 16 moves up slightly allowing member 47 to move clockwise as described heretofore and allowing the release of energy from spring 27 to operate the clock mechanism 8. Bread carriage 4 remains in its depressed position due to gravitational force exerted thereon. Clock 8 allows rotation of lever 25 in a counterclockwise direction under the force of spring 27 and element 47 moves upward gradually. After a period determined by the position of cam member 43, pawl 34 is released, and the lever 25 snaps to uppermost position, utilizing the remaining energy stored in spring 27, carrying pin 50 above tab 52, and thereby allowing member 47 to rotate counterclockwise. The movement of lever 25 opens switch 9, and during this movement the lever strikes pin 22, driving it out of engagement with shoulder 24 into the portion of slot 17 which is aligned with post 11. Slide 19 then rises under the influence of spring 21, carrying with it bread carriage 4, thus ejecting the bread and causing arm 16 to rise to its uppermost position, so that shoulder 54 of member 47 may be positioned therebeneath ready for the next operation.

Although the toaster shown is of the type which is uncompensated, and must thus be preheated before making toast slices, it is obvious that a clock compensated for the thermal condition of the bread well in well known manner could be employed. In this case, a clock having a somewhat longer cycle would have to be employed in order to permit the cooking of a crisp, dark slice of toast from the cold condition if this is desired.

If the spring 27 does not provide the necessary force to drive the clock at the desired rate, a booster spring may be employed. In Figs. 11 and 12, a booster spring is shown at 78 in cooperation with a bell crank 79 which engages member 37 and urges it counterclockwise.

Figure 7:
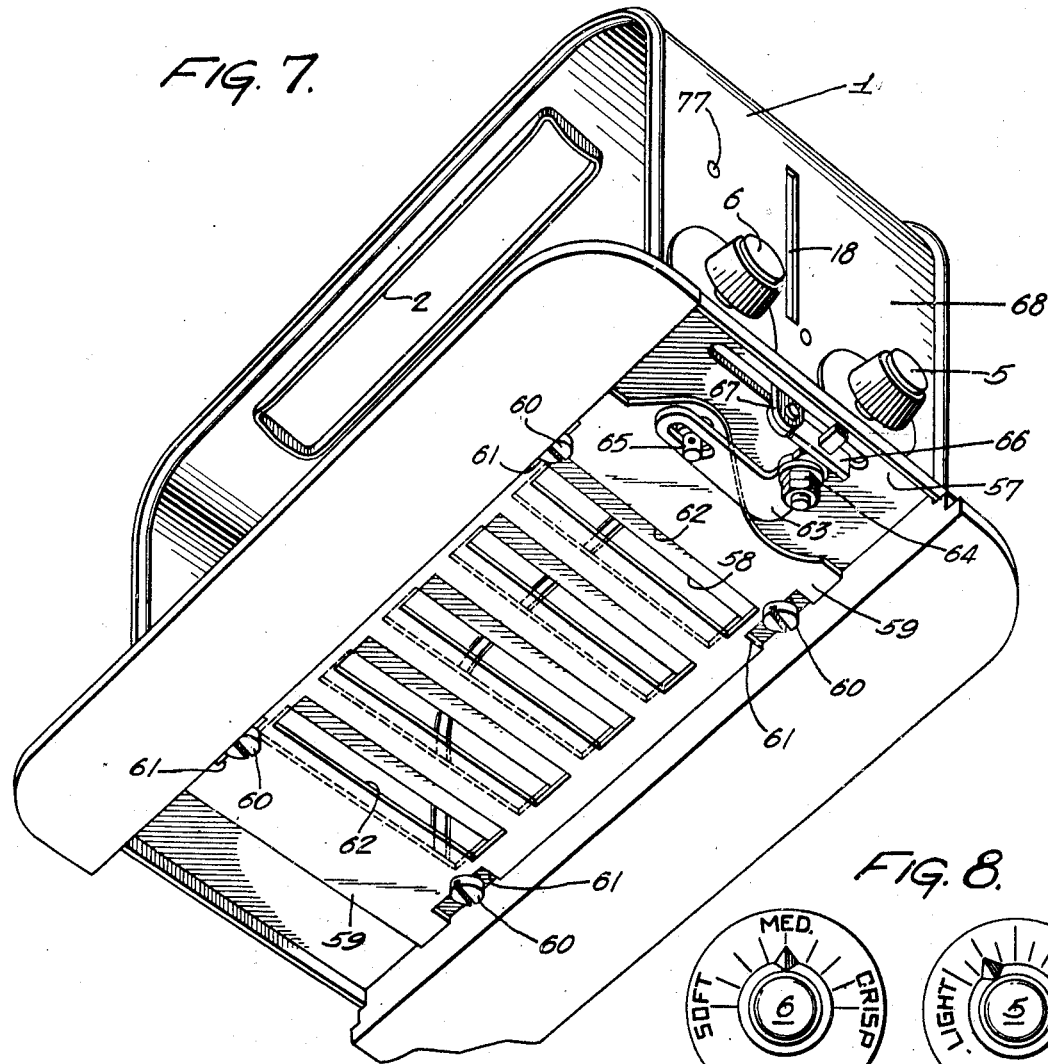
Fig. 7 is a perspective view of the outer shell and base of the toaster taken from such an angle as to show the ventilating means by which the cooking rate is varied.

Referring now particularly to Figs. 7, 10 and 14, the base plate 57 has a series of openings 58 therein. A plate 59 is slidably mounted on the base plate, for example by screws 60 cooperating with cut-out recesses 61 at the sides of plate 59. Plate 59 has a series of openings 62 of the same size and spacing as openings 58 and adapted to cooperate therewith. When plate 59 is fully toward the front of the toaster, the openings 62 are not aligned with openings 58 and the ventilation of the toaster is highly restricted. When plate 59 is fully toward the rear, the openings 62 and the openings 58 are fully aligned, permitting a high degree of ventilation. A bell crank 63 is pivotally mounted on base 57 at 64 and is connected to plate 59 by the pin and slot connection 65. The forward end of bell crank 63 extends through a slot in a link 66 which is pivotally attached to an arm of a bell crank 67 mounted on the wall 68 of the toaster cover at 67a. The other arm of bell crank 67 is pivotally coupled to one end of a link 69 by a pin 70 which extends through and is actuated by a slotted cam 71 rotatably mounted on wall 68 at 72 and carrying the crispness control knob 6. The other end of link 69 carries a pin 73 which extends into the cam slot of a second cam 74 rotatably mounted on wall 68 at 75 and carrying the color control knob 5. A link 76 has its ends pivotally connected to arm 46 and link 69, respectively. Arm 46 is pivotally attached to wall 68 at 77.

By means of the above-described linkages and cams, the time duration of the toasting cycle and the toasting rate are controlled, as will be seen from the following description of the operation. For soft toast, knob 6 is rotated fully counterclockwise, as viewed in Figures 2 and 8, which effects forward movement of plate 59 through the action of cam 71, bell crank 67, link 66 and bell crank 63, and the ventilation of the toaster is restricted. The knob 5 is adjusted to select a desired color of toast. Knob 5 rotates cam 74, which in full counterclockwise position, as viewed in Figures 2 and 8, adjusts the position of members 69, 76 and 46 so that cam member 43 is in such a position that the time of operation of the clock produces a piece of light toast. As the knob 5 is rotated clockwise, cam 74 operates through linkage 67, 76, 46 to move cam member 43 clockwise, as viewed in Fig. 15, thus increasing the time duration of the toasting cycle to produce darker toast.

If crisper toast is desired, knob 6 is rotated clockwise, which effects rearward movement of plate 59 through the clockwise rotation of cam 71 and the associated linkage, thus bringing slots 62 into increasing alignment with slots 58. The passage of a greater current of air through the toaster reduces the toasting rate, so that the bread must be toasted longer to obtain the desired color. When cam 71 is rotated clockwise, link 69 is also rotated clockwise about pin 73, thus moving link 76 generally upward, with a resulting increase in time duration of the toasting cycle. For any setting of the color control cam 74, adjustment of the crispness control cam 71 will vary the toasting rate and will simultaneously vary the time duration of the toasting cycle in correlation with the toasting rate to give the desired degree of crispness as well as the desired color.

With a particular toasting rate established by the setting of cam 71, the color of the toasted bread depends upon the time duration of the toasting cycle which is established by the adjustment of the color control cam 74. Hence the cam 74 varies the time duration only of the toasting cycle. With a particular setting of cam 74 to give a desired color, adjustment of cam 71 must not only vary the toasting rate but must also vary the time duration of the toasting cycle in proper correlation therewith so as to obtain the desired crispness and the desired color. The cams and associated linkages are designed to give the above results, and if they are constructed and arranged substantially as illustrated, such results will be obtained.

The invention is capable of modification by those skilled in the art and is not limited in scope by the specific embodiment disclosed, but only by the appended claims.

I claim:

1. In an automatic toaster, bread toasting means, means for controlling the duration of the toasting period, means for adjusting the rate of bread toasting, manually-operable means for adjusting said second-named means, and other manually-operable means for adjusting said third-named means and for further adjusting said second-named means, whereby to obtain toast of a desired color and crispness.

2. In an automatic bread toaster, manually-adjustable means for controlling the duration of the toasting cycle according to the color of toast desired, and other manually-adjustable means for controlling both the toasting rate and the cycle duration in correlation to give a desired degree of toast crispness when the bread reaches the said color.

3. In an automatic bread toaster, adjustable timing means for controlling the duration of the toasting cycle, manually-controllable means for adjusting said timing means according to the color of toast desired, and manually-adjustable means for varying the toasting rate and for simultaneously adjusting said timing means in correlation with the toasting rate to give a desired degree of toast crispness when the bread reaches the said color.

4. In an automatic bread toaster, adjustable timing means for controlling the duration of the toasting cycle, manually controllable means for adjusting said timing means according to the color of toast desired, adjustable ventilating means for varying the toasting rate, and manually-controllable means for adjusting both said ventilating means and said timing means in correlation to give a desired degree of toast crispness when the bread reaches the said color.

5. In an automatic bread toaster, adjustable means for controlling the duration of the toasting cycle, adjustable means for controlling the toasting rate, and manually-controllable means for adjusting said first two means in correlation to effect toasting of the bread to a desired color and a desired degree of crispness.

6. In an automatic bread toaster, adjustable means for controlling the duration of the toasting cycle, adjustable means for controlling the toasting rate, a pair of control manuals, means operable by one of said manuals to adjust said first means according to the color of toast desired, and means operable by the other of said manuals for adjusting said first two means in correlation to impart a desired degree of crispness to the bread when it reaches the said color.

7. In an automatic bread toaster, mechanically adjustable timing means for controlling the duration of the toasting cycle, mechanically adjustable ventilating means for controlling the toasting rate, a pair of manually-adjustable cams, an operating linkage between one of said cams and said ventilating means for adjusting the latter, and a linkage between both of said cams and said timing means for adjusting the latter, said cams and said linkages being constructed and arranged to adjust the timing means and the ventilating means in correlation to effect toasting of the bread to a desired color and a desired degree of crispness.

8. In an automatic bread toaster, adjustable timing means for varying the duration of the toasting cycle to obtain toast of a desired color, means for varying the toasting rate to obtain varying degrees of crispness of the toast, and means for adjusting said timing means in correlation with adjustment of said last-named means, thereby to correlate the time duration of the toasting cycle with the toasting rate and thus obtain the desired color of the toast irrespective of variation of the degree of crispness.

9. In an automatic bread toaster, adjustable timing means for varying the duration of the toasting cycle to obtain toast of a desired color, adjustable ventilating means for varying the toasting rate to obtain varying degrees of crispness of the toast, and means for adjusting said timing means in correlation with adjustment of said ventilating means, thereby to correlate the time duration of the toasting cycle with the toasting rate and thus obtain the desired color of the toast irrespective of variation of the degree of crispness.

10. In an automatic toaster, means movable between operative and inoperative positions for initiating and terminating the toasting operation, means urging said movable means to its inoperative position, means for latching said movable means in its operative position, means for releasing said latching means to terminate the toasting cycle, adjustable timing means for controlling the operation of said releasing means, means for adjusting said timing means to vary the duration of the toasting cycle and thus obtain toast of a desired color, means for varying the toasting rate to obtain varying degrees of crispness of the toast, and means for adjusting said timing means in correlation with the adjustment of said last-named means, thereby to correlate the time duration of the toasting cycle with the toasting rate and thus obtain the desired color of the toast irrespective of variation of the degree of crispness.

11. In an automatic toaster, means movable between operative and inoperative positions for initiating and terminating the toasting operation, means urging said movable means to its inoperative position, means for latching said movable means in its operative position, means for releasing said latching means to terminate the toasting cycle, adjustable timing means for controlling the operation of said releasing means, means for adjusting said timing means to vary the duration of the toasting cycle and thus obtain toast of a desired color, adjustable ventilating means for varying the toasting rate to obtain varying degrees of crispness of the toast, and means for adjusting said timing means in correlation with the adjustment of said ventilating means, thereby to correlate the time duration of the toasting cycle with the toasting rate and thus obtain the desired color of the toast irrespective of variation of the degree of crispness.

12. In a toaster, a base having spaced air openings therein, a toasting chamber above said base and adapted to receive air admitted through said openings, a movable member adjacent to said base and having openings arranged for varying alignment with the openings in the base, and manually adjustable means for variably positioning said member, to thereby vary the ventilation of said toasting chamber and thus vary the rate of toasting.

13. In a toaster, a base having spaced air openings therein, a toasting chamber above said base and adapted to receive air admitted through said openings, a movable member adjacent to said base and having openings arranged for varying alignment with the openings in the base, means for varying the duration of the toasting cycle to obtain toast of a desired color, means for variably positioning said member to vary the ventilation of said toasting chamber, thereby to vary the toasting rate and thus obtain varying degrees of crispness of the toast, and means for adjusting said first-named means in correlation with the positioning of said member, thereby to correlate the time duration of the toasting cycle with the toasting rate and thus obtain the desired color of the toast irrespective of variation of the degree of crispness.

14. In a toaster, a base having spaced air openings therein, a toasting chamber above said base and adapted to receive air admitted through said openings, a movable member adjacent to said base and having openings arranged for varying alignment with the openings in the base, adjustable timing means for varying the duration of the toasting cycle to obtain toast of a desired color, means for variably positioning said member to vary the ventilation of said toasting chamber, thereby to vary the toasting rate and thus obtain varying degrees of crispness of the toast, and means for adjusting said timing means in correlation with the positioning of said member, thereby to correlate the time duration of the toasting cycle with the toasting rate and thus obtain the desired color of the toast irrespective of variation of the degree of crispness.

15. In an automatic toaster, manually operable means for controlling the duration of the toasting cycle to obtain toast of a desired color, manually operable means for controlling the toasting rate to obtain a desired degree of crispness of the toast, and means responsive to adjustment of said crispness control means for varying the duration of the toasting cycle in correlation with the toasting rate, so as to obtain the desired color irrespective of the crispness control adjustment.

JOSEPH W. MYERS.